United States Patent [19]

Speranza et al.

[11] Patent Number: 4,897,430

[45] Date of Patent: Jan. 30, 1990

[54] ONE COMPONENT POLYUREA

[75] Inventors: George P. Speranza; Wei-Yang Su, both of Austin, Tex.

[73] Assignee: Texaco Chemical Company, White Plains, N.Y.

[21] Appl. No.: 265,081

[22] Filed: Oct. 31, 1988

[51] Int. Cl.$^4$ ............................................. C08G 18/32
[52] U.S. Cl. ..................................... 521/159; 521/163; 528/60; 528/68
[58] Field of Search .................... 528/60, 68; 521/163, 521/159

[56] References Cited

U.S. PATENT DOCUMENTS

| | | | |
|---|---|---|---|
| 3,179,606 | 4/1965 | Prescott et al. | 521/163 |
| 3,236,895 | 2/1966 | Lee et al. | 528/60 |
| 3,963,680 | 6/1976 | O'Keefe et al. | 528/53 |
| 3,979,364 | 9/1976 | Rowton | 528/76 |
| 4,178,427 | 12/1979 | Waddill et al. | 521/124 |
| 4,474,901 | 10/1984 | Dominguez | 521/163 |
| 4,483,974 | 11/1984 | Grogler et al. | 528/68 |
| 4,581,386 | 4/1986 | Taylor | 521/125 |
| 4,595,445 | 6/1986 | Hombach et al. | 156/307.3 |
| 4,631,298 | 12/1986 | Presswood | 521/163 |
| 4,645,630 | 2/1987 | Rasshofer et al. | 264/54 |
| 4,705,814 | 11/1987 | Grigsby et al. | 521/159 |
| 4,732,919 | 3/1988 | Grigsby et al. | 521/159 |
| 4,748,192 | 5/1988 | Smith | 521/107 |
| 4,761,465 | 8/1988 | Speranza et al. | 528/45 |
| 4,767,836 | 8/1988 | Cuscurida | 528/45 |

OTHER PUBLICATIONS

M. Agostinho et al., "A High Solids One-Compound, Low Temperature Bake Epoxy Coating," Journal of Coatings Technology, vol. 60, No. 764, Sep. 1988.

*Primary Examiner*—Maurice J. Welsh
*Assistant Examiner*—L. Henderson
*Attorney, Agent, or Firm*—Jack H. Park; Kenneth R. Priem

[57] ABSTRACT

One component mixtures of tri- and higher functional polyoxyalklyeneamines and aromatic polyisocyanates do not react or react only partially at room temperature and are cured by intimate mixing and heating. They are useful as caulks, sealants, and adhesives, for example.

8 Claims, No Drawings

ONE COMPONENT POLYUREA

BACKGROUND OF THE INVENTION

It is generally accepted that amines react almost instantaneously with isocyanates. Aliphatic amines usually react more rapidly than aromatic amines with isocyanates and aromatic isocyanates usually react more rapidly with amines than aliphatic isocyanates. Prior to the development of polyurea RIM technology as exemplified by U.S. Pat. No. 4,433,067 the reaction of amines and isocyanates was thought to be so rapid as to prevent many uses.

We have made a discovery which contradicts these accepted observations in some cases and which provides highly useful products.

SUMMARY OF THE INVENTION

The invention is a one component polyurea forming mixture which is stable at ambient temperature*[1] and comprises a liquid mixture of an aromatic isocyanate and a tri- or higher functionality polyoxyalkyleneamine which are not reactive with each other at ambient temperature. The invention is also a method for curing the above mixture by raising its temperature until reaction proceeds. 16 [1]*As used in this application ambient temperature is from about 10° C. to about 30° C.

DESCRIPTION OF THEIR PREFERRED EMBODIMENTS

Our invention describes a unique combination of polyoxyalkylenepolyamines and aromatic isocyanates which do not react to form polymeric molecules rapidly at ambient temperatures and thus remain storage stable.

The polyoxyalkylenepolyamines useful in our invention are those which are not miscible with the aromatic isocyanates to be used. Polyoxyalkylene amines of tri- or higher functionality are useful.

Triamines of less than about 1000 molecular weight as described below are useful as are higher functionality amines depending on their miscibility characteristics with the isocyanate.

Preferred amines have structures as follows:

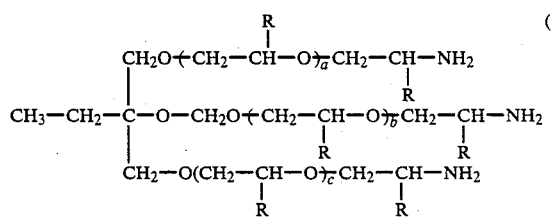

where a, b, c are 1–3
where R is $CH_3$, $C_2H_5$—etc.

Also useful are condensation products of I with dibasic carboxylic acids:

Also useful are:

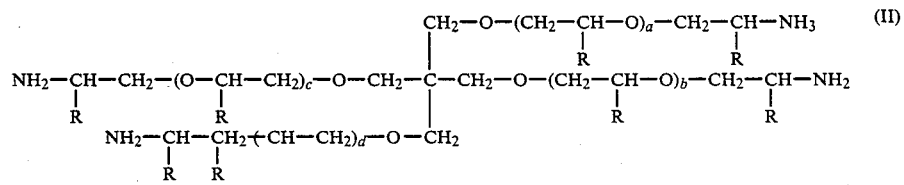

where
a, b, c, d are 1 to 4
R is $CH_3$, $C_2H_5$ ect. are mixtures thereof and

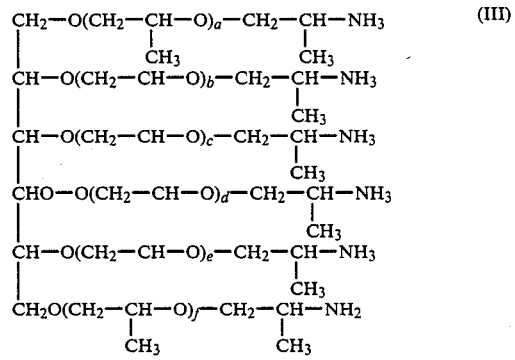

where a–f = 1–6

The amine terminated polyethers in this invention are polyethers made from an appropriate initiator to which lower alkylene oxides such as ethylene oxide, propylene oxide, butylene oxide or mixtures thereof are added with the resulting hydroxyl terminated polyol then being aminated. When two or more oxides are used, they ma be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated as outlined in U.S. Pat. No. 3,654,370, incorporated herein by reference.

A wide variety of polyaromatic polyisocyanates may be used here. Typical aromatic polyisocyanates include polymethylene polyphenylisocyanate, naphthalene-1,4-diisocyanate, bis(4-isocyanatophenyl)methane, (bis(3-methyl-4-isocyanatophenyl)methane, and 4,4'-diphenylpropane diisocyanate.

Isocyanates such as:

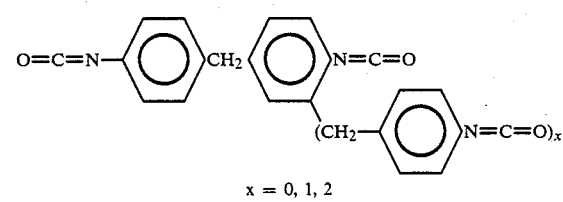

x = 0, 1, 2 and derivatives are useful. Although TDI could possibly be useful, its volatility and faster reactivity may limit its usefulness.

Other polyaromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4,'-isomer with the remainder being polymethylene polyphenyl polyisocyanates of higher molucular weight and functionality that have an average functionality of from about 2.1 to about 3.5. These isocyanate mixtures are known, commercially available materials and can be prepared by the process described in U. S. Pat. No. 3,362,979, issued Jan. 9, 1968 to Floyd E. Bentley.

By far the most preferred polyaromatic polyisocyanate is methylene bis(4-phenylisocyanate) or MDI. Pure MDI, quasi-prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

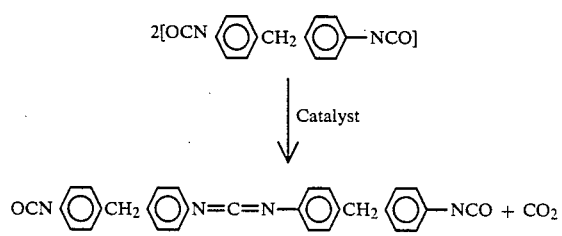

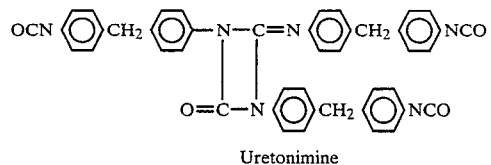

Examples of commercial materials of this type are Upjohn's ISONATE ®125M (pure MDI) and ISONATE 143L (liquid MDI). Preferably, the amount of isocyanates used is the stoichiometric amount based on all the ingredients in the formulation or greater than the stoichiometric amount, if desired.

Of course, the term polyisocyanate also includes quasi-prepolymers of these polyisocyanates with active hydrogen containing materials where the isocyanate is in stoichiometric excess to the active hydrogen containing material. Where these quasi-prepolymers are miscible or partially miscible with the amine terminated polyethers of this invention a partial reaction may take place.

As the examples will show even where a polyaromatic isocyanate is stable and remains liquid at ambient temperatures with an amine terminated polyether of this invention, a quasi-prepolymer of the same isocyanate may react to some appreciable degree with the amine terminated polyether.

If this reaction forms a gel which progressively gets harder at ambient temperature and is, therefore, not stable, the mixture is not preferred. However, in another embodiment of our invention, if the reaction only proceeds to a limited extent at ambient temperature and the mixture ceases the thickening process while the material is still workable and useful as a gel or thickened liquid, the system is still useful since the reaction proceeding to final hardening requires added heat.

The following examples show the practice of the invention and demonstrate the usefulness thereof.

EXAMPLES

In the examples an initial attempt was made to mix the ingredients by low speed power mixing or hand mixing. Where the reaction was slow or not apparent at room temperature, the liquid ingredients were not miscible. Where the liquid reactants were miscible at room temperature reaction took place.

EXAMPLE 1

| Sakrete | 30 grams | (Portland Cement and Sand) |
| Jeffamine ® T-403 | 13.3 grams | (a homologue of T-5000 with a molecular weight of 400 instead of 5000) |
| Water | 2.5 grams | |
| Silicone Oil | 0.5 grams | (DC-193-Dow Corning) |
| Mondur MR | 13.3 grams | (Mobay) |

There was no reaction on stirring of this mixture at room temperature. The same experiment was repeated with a different lot of T-403. The same results were obtained.

EXAMPLE 2

| | | |
|---|---|---|
| Sakrete | 30 g | |
| JEFFA-<br>MINE D-230 | 11.5 g | [NH$_2$—(CH—CH$_2$O)$_3$—CH$_2$—CH—NH$_2$]<br>           \|                                   \|<br>          CH$_3$                            CH$_3$ |
| DC-193 | 0.5 g | |
| Water | 7 g | |
| Mondur MR | 13.5 g | |

As soon as the stirrer was started a reaction took place and the contents congealed around the stirrer.

EXAMPLE 3

| | |
|---|---|
| Sakrete | 30 g |
| JEFFAMINE ED-900 | 49 g |
| Water | 9 g |
| Mondur MR | 6.75 g |

As soon as the reactants were mixed and stirred the contents congealed. On standing overnight the volume doubled.

EXAMPLE 4

| | | |
|---|---|---|
| Sakrete | 30 g | |
| JEFFAMINE<br>D-2000 | 50 g | NH$_2$(CH—CH$_2$O)$_{33}$—CH$_2$—CH—NH$_2$<br>          \|                                 \|<br>         CH$_3$                         CH$_3$ |
| Water | 5 g | |
| Mondur MR | 6.6 g | |

After stirring, the reactants congealed and were in the form of a ball due to the rapid reaction.

We subsequently found that JEFFAMINE ® T-403 did not react with stirring at room temperature with Isocyanate ISONATE 143-L or a prepolymer of isocyanate Isonate 143-L and THANOL SF-5505. Isonate 143-L is a polyarylisocyanate obtained from Upjohn and THANOL SF-5505 is a 5500 molecular weight triol obtained from Texaco Chemical Company. JEFFAMINE T-403 amine did react with aliphatic diisocyanates and with toluene diisoyanate. The observation was made that there was a compatibility problem with polyaromatic isocyanates such as Mondur MR and Isonate 143L and JEFFAMINE ® T-403.

EXAMPLE 5

To a small paper cup was added 10g of JEFFAMINE ® T-3000 amine and 1.34 grams of Mondur MR isocyanate. On stirring with a tongue depressor the materials reacted and congealed. However, not all of the T-3000 reacted. There was liquid and a ball. Additional Mondur MR resulted in complete reaction.

EXAMPLE 6

To a small cup was added 4.68g of JEFFAMINE ® T-703 amine (a 700 molecular weight homologue of T-403) and 2.6g of Mondur MR. No heat was given off and a brown liquid (isocyanate) settled to the bottom. Excess isocyanate was added and there was still no reaction. Liquid amine was still present.

EXAMPLE 7

To a small cup was added 3g of Mondur MR and 7.46g of JEFFAMINE ® T-1003. There was some reaction but the reaction was far from complete. Still a lot of amine was left and that which did react was soft and not hard as in the case of the T-3000. After the unusual results obtained in experiments 1–7 we attempted to find the conditions under which the Triamines of low molecular weight would react.

EXAMPLE 8A 4.68g of JEFFAMINE ® T-703 amine was mixed with 2.86g of Isonate 143L. A somewhat heterogeneous solution was formed on stirring but there was no reaction. On heating for one hour at 100° C. it was almost all cured (congealed). At 150° C. after one hour a hard polymer was obtained. This proves the utility as a delayed action polymer for use as sealants, caulks and adhesives.

EXAMPLE 8B 5.70g of JEFFAMINE ® T-703 was mixed with a quasi-prepolymer made from JEFFAMINE T-5000 and Isonate 143L (e.w. 310) 7.51g. This would be an all polyurea delayed action system. There was no reaction after stirring at room temperature and two layers separated. After heating at 100° C. and one hour it was almost all cured. At 150° C. and 1.5 hours it was all cured except for a small amount of liquid.

EXAMPLE 8C 4.68g of JEFFAMINE T-703 was mixed with a quasi-prepolymer of Isonate 143L and PPG-2000 (e.w. 269) (6303-81A). No reaction occurred at room temperature and two layers separated. At 100° C. it was almost all cured (congealed) while at 150° C. it was all cured.

EXAMPLE 8D 4.68g of JEFFAMINE T-703 and a prepolymer of THANOL SF-5505 (5.16g, e.w. 258) were mixed but did not react at room temperature. After one hour at 100° C. it was almost all cured. At 150° C. and 1.5 hours in an oven it was all cured.

EXAMPLE 9

JEFFAMINE T-403 amine was substituted for T-703 in experiments like 8A-8D. The same observations were made as in the case of T-703.

EXAMPLE 10

A tetrafunctional amine was made by condensing T-403 with adipic acid as follows:

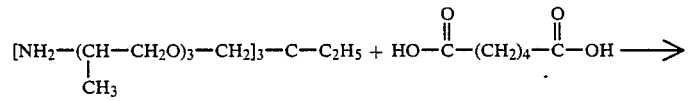

-continued $$[[NH_2-(CH(CH_3)-CH_2O)_3-CH_2[_2-C(C_2H_5)-CH_2-(O-CH_2-CH(CH_3))_3NH-\overset{O}{\underset{\|}{C}}-CH_2-CH_2-]_2$$

This tetrafunctional amine did not react at room temperature with the isocyanates described in 8A to 8D. In general, this tetramine showed more reluctance to react at 100®C. than T-703. After one hour at 100®C. the mixtures generally set to a gel but did not set to a hard polymer. At 150° C. the products set to a hard polymer with some foaming. This indicates the formation of delayed action foams.

EXAMPLE 11

JEFFAMINE® T-403 was allowed to react by mixing with the isocyanates in 8A-8D in the presence of catalysts. The results were as if no catalysts were used. The catalysts tried included triethylene diamine in dipropylene glycol (THANCAT TD-33A), dimethylpiperazine and dibutyl tin dilaurate.

EXAMPLE 12

JEFFAMINE® T-403 (26.8Sg) was allowed to react by mixing with a quasi-prepolymer made from Isonate 143L and PPG-2000 (53.8g) in the presence of 5.4g of water. A hard foam was obtained after about 2.5 hours at room temperature.

EXAMPLE 13

The following ingredients were mixed:

| T-403 | 13.4 g | |
|---|---|---|
| DETDA | 8.9 g | (diethyltoluenediamine) |
| RIMTEX 50.02 | 5.16 g | (quasi-prepolymer SF-5505 & Isonate 143 L) |

The above mixture did not gel after four hours at room temperature. After standing overnight the mixture became a semi-gel. After one hour at 150° C. a hard cured polymer was obtained.

EXAMPLE 14

The following ingredients were mixed:

| JEFFAMINE D-400 | 20 g |
|---|---|
| JEFFAMINE T-403 | 13.4 g |
| RIMTEX 50.02 | 51.6 g |

This mixture has a tendency to separate. A clear liquid will separate with room temperature curing. After 150° C. and one hour in the oven it all cured to a hard solid.

EXAMPLE 15

The following ingredients were mixed:

| JEFFAMINE D-230 | 11.5 |
|---|---|
| JEFFAMINE T-403 | 13.4 g |
| RIMTEX 50.02 | 51.6 g |

After standing at room temperature a small amount of liquid separated from the main mixture. After standing overnight a semi-gel formed. After one hour at 150° C. it all cured.

EXAMPLE 16

The following ingredients were mixed:

| JEFFAMINE T-403 | 26.8 g | |
|---|---|---|
| Hilene W | 26.2 | 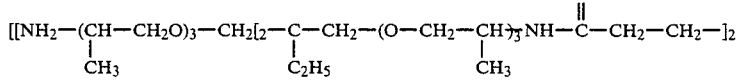 |

After five seconds at room temperature the mixture gelled. This shows that aliphatic isocyanates react immediately with trifunctional polyoxyalkyene amines.

EXAMPLES 17A and 17B

The following ingredients were mixed:

| A. JEFFAMINE T-403 | 26.8 g | |
|---|---|---|
| TDI/SF-5505 quasi-prepolymer | 36.6 g | (toluene diisocyanate) |

There is some reaction on being stirred at room temperature. At 100° C. for 30 minutes it is completely cured.

| B. JEFFAMINE T-403 | 26.8 g |
|---|---|
| TDI | 17.4 g |

At room temperature it did not react immediately but congealed eventually.

18-A-1

Acetone was added to T-403, the isocyanate was added.

| T-403 | 14.6 g |
|---|---|
| Acetone | 20.6 g |
| Rimtex 50.02 | 25.8 g |

Upon mixing with a stirrer, a ball formed around the blade after the Rimtex isocyanate was added. The ball grew and cured in about 15 minutes. 18-A-2

About the same results were obtained when prepolymer 6303-81A was used. Apparently acetone serves as a partial mutual solvent for the isocyanate and amine.

| 18-A-3 | |
|---|---|
| T-403 | 14.3 g |
| Rimtex 50.02 | 25.8 g |
| Cab-o-sil | 1.2 g |

The above mixture was stable at room temperature. After mixing for one hour at 150° C., hard foam was obtained.

| 18-A-4 | |
|---|---|
| T-403 | 13.8 g |

-continued

| 18-A-4 | |
|---|---|
| Rimtex 50.02 | 27.0 g |
| Titanium dioxide | 3.3 g |

The above mixture was stable at room temperature. After one hour at 150° C. a very hard foam was obtained. Since no attempt was made to dry the filler, the expansion was about 5 times the original volume.

| 18-A-5 | |
|---|---|
| T-403 | 13.4 g |
| Rimtex 50.02 | 25.8 g |
| Toluene | 22.3 g |

A heterogeneous mixture formed and after one day the above mixture was still heterogeneous. After the toluene evaporated from the open vessel the product started to cure from the reaction of water vapor in the air.

18-A-6

Tertiary butyl alcohol was used as a diluent for the mixture of 18-A-5. Results were the same as above.

18-A-7

JEFFAMINE T-403 did not react with Rimtex 50.02 in the presence of propylene carbonate. Some titanium dioxide was added and there was curing at 150° C. after one hour.

| 18-A-8 | |
|---|---|
| T-403 | 13.8 g |
| Rimtex 50.02 | 25.8 g |
| CaSO$_4$ | 3.0 g |

After the ingredients were exposed to moisture in the air and allowed to stand overnight, there was some gelling. The mixture formed a very hard product after being heated at 150° C. for one hour.

| 18-A-9 | |
|---|---|
| T-403 | 13.4 g |
| Rimtex 50.02 | 25.8 g |
| Flaked glass | 5.1 g |

The contents formed a very hard product after curing at 150° C. for one hour. Mixture did gel to some extent when exposed to moisture after 12 hours at room temperature.

| 18-A-10 | |
|---|---|
| T-403 | 13.4 g |
| Rimtex 50.02 | 25.8 |
| Polyethylene terephthalate | 4.3 g |
| Ethylene carbonate | 4.4 g |

Considerable foaming occured after one hour at 150° C. for one hour. The foam was hard but had some resiliency.

| 18-A-11 | | |
|---|---|---|
| T-403 | 13.4 g | |
| Rimtex 50.02 | 25.8 g | |
| SURFONIC ® N-95 | 1.0 g | (nonylphenol 9.5 mole ethylene oxide adduct) |

A hard foam was obtained when the mixture was heated at 150° C. for one hour.

18-A-12

T-403, Rimtex 50.02 and adipic acid formed a heterogeneous mixture. A foam formed after one hour at 150° C.

18-A-13

T-403, Rimtex 50.02 and dimer acid also formed a mixture that was difficult to mix due to the immiscibility of the ingredients.

| 18-A-14 | | |
|---|---|---|
| T-403 | 6.7 g | |
| DETA | 8.9 g | (Diethyl toluene diamine) |
| Rimtex 50.02 | 25.8 g | |
| Flaked glass | 5.0 g | |

A very hard product was obtained when this mixture was heated at 150° C. for one hour.

| 18-A-15 | |
|---|---|
| T-403 | 13.4 g |
| Epon 828 | 1.7 g |
| Rimtex 50.02 | 25.8 g |

Some creaming (apparent reacting) took place at room temperature but no complete cure took place. After one hour at 150° C., an attractive high-density foam was obtained.

| 18-A-16 | | |
|---|---|---|
| T-403 | 13.4 g | |
| Rimtex 50.02 | 25.8 g | |
| Silicon DC-193 | 1.0 g | (Dow Corning) |

There was no reaction at room temperature. After heating in an open vessel for one hour at 150° C., a very hard foam was obtained.

18-A-17

Same as above when 1.0 g of Silwet L-711 (Carbide) was used.

| 18-A-18 | |
|---|---|
| T-403 | 13.4 g |
| Epon 828 | 1.7 g |
| Rimtex 50.02 | 25.8 g |
| DC-193 | 1.0 g |

No reaction at room temperature but at 150° C. and 1 hour a very hard foam was obtained.

18-A-19

Same as above when L-711 was used.

The products of this invention will be especially useful in preparing one component caulks, sealants, adhesives, etc. In addition, other polymers can be mixed with the isocyanate and polyamines to make alloys and interpenetrating polymers. Monomers such as vinyl monomers can also be used with isocyanates and amines and the whole batch polymerized at will. Water can be added to make foamed articles. The density of the foams can be reduced considerably by the addition of low boiling organic solvents. Fillers can be added to reduce the cost and add some reinforcing properties.

This is a simple way also of encapsulating materials such as catalysts, pigments, minerals, inorganic salts, etc.

GLOSSARY

JEFFAMINE ® T-403
JEFFAMINE ® T-703
JEFFAMINE ® T-1003
JEFFAMINE ® T-3000
JEFFAMINE ® T-5000

These products are polyoxyalkylenetriamines with the approximate molecular weight designated by the number. Products of Texaco Chemical Company.

JEFFAMINE ® D-230
JEFFAMINE ® D-2000

These products are polyoxyalkylenediamines with the approximate molecular weight indicated by the number. Products of Texaco Chemical Company.

JEFFAMINE ® ED-900

Polyoxyethylenediamine of approximately 900 molecular weight. A product of Texaco Chemical Company.

THANOL SF 5505

A 5000 molecular weight polyol which is principally propylene oxide with an ethylene oxide cap. A product of ARCO Chemical Company. p0 PPG 2000

Polypropylene glycol of about 2000 molecular weight.

ISONATE 1431 (Product of Dow Chemical Company)
MONDUR MR (Product of Mobay Chemical Company)

Polyaromatic polyisocyanates.

SILWET/L-711

Silicone Surfactant. Product of Union Carbide.

DC-193

Silicone Surfactant. Product of Dow Corning.

We claim:

1. A method for curing a mixture of a liquid polyaromatic polyisocyanate and an amide consisting essentially of a tri- or higher amine functionally polyoxyalkyleneamine of less than 1000 molecular weight which are not reactive with each other at ambient temperature by raising the temperature of the mixture until reaction proceeds.

2. A method as in claim 1 wherein the polyoxyalkyleneamine is a polyoxypropylenetriamine of about 400 molecular weight.

3. A method as in claim 1 wherein the polyoxyalkyleneamine is a polyoxypropylenetriamine of about 700 molecular weight.

4. A method as in claim 1 wherein wherein the aromatic isocyanate is diphenylmethane diisocyanate.

5. A method for curing a mixture of a liquid polyaromatic polyisocyanate and an amine consisting essentially of a tri- or higher amine functionality polyoxyalkyleneamine of less than 1,000 molecular weight which are reactive to a limited extent which each other at ambient temperature by raising the temperature of the mixture until reaction proceeds.

6. A method as in claim 5 wherein the polyoxyalkyleneamine is a polyoxypropylenetriamine of about 400 molecular weight.

7. A method as in claim 5 wherein the polyoxyalkyleneamine is a polyoxypropylenetriamine of about 700 molecular weight.

8. A method as in claim 5 wherein the aromatic isocyanate is diphenyl methane diisocyanate.

* * * * *